Oct. 23, 1951 S. A. HALL 2,572,139

PHONOGRAPH REPRODUCING DEVICE

Filed March 12, 1946 2 SHEETS—SHEET 1

INVENTOR.
Stanley A. Hall
BY
Shoodling and Krost
attys

Oct. 23, 1951 S. A. HALL 2,572,139

PHONOGRAPH REPRODUCING DEVICE

Filed March 12, 1946 2 SHEETS—SHEET 2

INVENTOR.
Stanley A. Hall
BY
Strodling and Kost
Attys.

Patented Oct. 23, 1951 2,572,139

UNITED STATES PATENT OFFICE 2,572,139

PHONOGRAPH REPRODUCING DEVICE

Stanley A. Hall, Vancouver, British Columbia, Canada

Application March 12, 1946, Serial No. 653,732

4 Claims. (Cl. 179—100.41)

My invention relates in general to a device for producing sound from the undulated grooves on a phonograph record as the record is rotated and in particular to a device responsive to the undulated grooves of a rotating phonograph record for producing torsional vibration which will actuate a sound producing mechanism.

An object of my invention is the provision of the pick-up device for a record player which may be used in any position.

Another object of my invention is the provision of a pick-up device for a record player in which the force of the stylus on the record is independent of the weight of the stylus support means.

Another object of my invention is the provision of a pick-up device for a record player which operates with the records rotating in any position.

A still further object of my invention is the provision of a device for engaging a record to produce vibration and for transmitting the vibration produced to a vibration responsive phonograph pick-up head.

Still a further object of my invention is the provision of a device having a stylus to be vibrated by the undulated grooves of a record, a vibration dampening mass engaging the stylus, and transmitting means for transmitting the torsional vibration produced by the combination of the mass and the stylus when the stylus is vibrated to a phonograph pick-up head.

Other objects and a fuller understanding of the invention may be had by referring to the following description and claims, taken in conjunction with the accompanying drawing, in which:

Figure 1 of my drawings illustrates the use of my pick-up device on a record player;

It is well known in the art of sound reproduction that a phonograph record has a spiral groove with undulations thereon. These undulations cause a pick-up needle or stylus to swing from side to side or vibrate as the record is rotated. The vibration of this stylus is transformed into corresponding electrical variations. The pick-up head, which produces these electrical variations is responsive to torsional or rotational vibration and movements. In prior art, the vibration of the stylus and the nonvibration of the pick-up head, which supports the stylus, causes the rotational movement of a stylus about an imaginary pivot point. The weight and inertia of the pick-up head causes it to remain relatively stationary when the stylus is vibrating. In prior art, this rotational movement or torsional vibration about an imaginary pivot point is usually produced within the space occupied by the pick-up head. In my improved device, the torsional vibration is produced by the combination and cooperation of a vibration dampening mass and the stylus. This torsional vibration is then transmitted through suitable movement transmitting means to the pick-up head where it is transformed into electrical variations.

Figure 1:
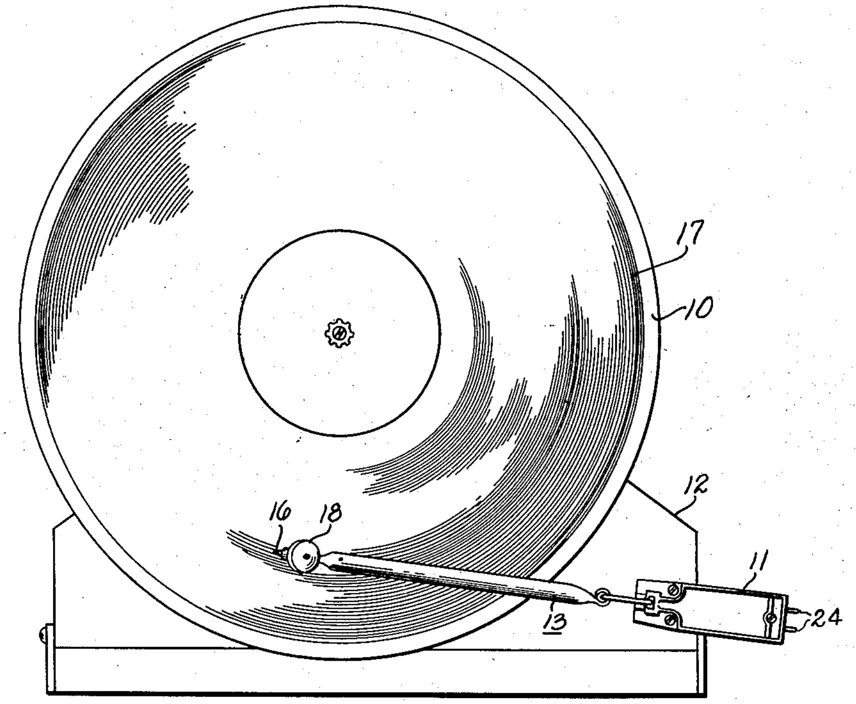

In my drawings, Figure 1 represents a record player on which a record 10 may be rotated. A pick-up head 11 transforms mechanical vibrations of the stylus, which are established by the undulated grooves of the record, into electrical variations for reproducing sound. In prior art, it has been the practice to mount the pick-up head in such a manner that it will travel over the record and carry the stylus therewith. In my invention, and as best illustrated in Figure 1, the pick-up head is mounted relatively stationary on the record player 12, which supports the record 10. In actual practice, the pick-up head 11 may be of any suitable construction such as is known in the field of practice. My invention comprises primarily the substitution of a stylus support arm 13 for a stylus itself. The stylus support arm is fastened in the pick-up head in the same manner in which a stylus generally is.

Figures 2, 3:
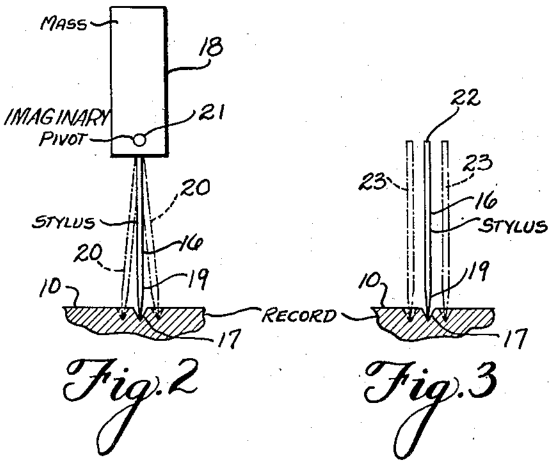
Figure 2 is a diagrammatic view illustrating the operation of the stylus with a vibration dampening mass mounted on top of the stylus.
Figure 3 is a diagrammatic view illustrating the stylus with the vibration dampening mass removed.

Figures 2 and 3 illustrate the method in which torsional vibrations are produced from vibrations of the stylus. A stylus 16 is shown to have one end thereof extending into an undulated groove 17 of the record 10. The other end of the stylus 16 is engaged with a vibration dampening mass 18. As the record 10 is rotated, the end 19 of the stylus which engages the undulated groove 17 of the record is reciprocally vibrated, as shown by the dotted portions 20. However, the vibration dampening mass 18, having a greater inertia than the stylus point 19 does not vibrate. The combination of the practically stationary vibration dampening mass and the vibration of the end 19 of the stylus establishes an imaginary pivot point 21 about which the end 19 of the stylus may be said to torsionally vibrate. The frequency and extent of torsional vibration is very small, and is regulated by the frequency and extent of vibration of the end 19 of the stylus 16. In Figure 3 it is best illustrated that the elimination of the vibration dampening mass 18 would cause the end 22 of the stylus to move reciprocally the same distance as the record end 19 moves. This is best illustrated by the dotted portions 23 which represent the movement of the stylus. It is noted that there is no imaginary pivot point in Figure 3 and thus there can be no torsional vibration or movement produced by the vibration of the record end 19 of the stylus 16. The support arm 13 is connected at this imaginary pivot point 21 to transfer the torsional vibrations to the pick-up head 11.

Figure 4:
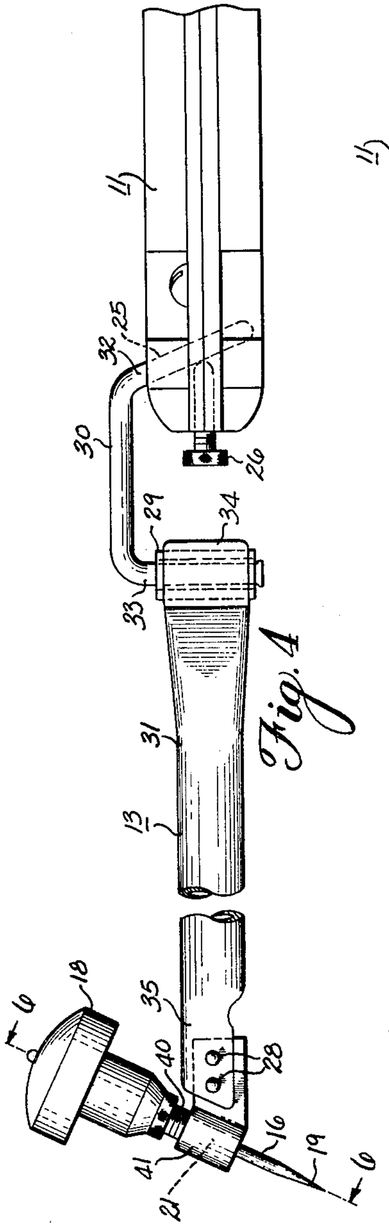
Figure 4 is an enlarged elevational view of my pick-up device.

In Figure 4 it may be seen that the pick-up head 11 has an opening 25 into which an ordinary stylus or other members may be inserted. A set screw 26 is used to clamp a stylus or other member into the opening 25. Wires may be connected to the contact points 24 to transmit the electrical variations produced from the pick-up head 11.

My stylus support arm 13 primarily comprises a substantially U-shaped member 30 and a tubular arm member 31. The substantially U-shaped member 30 has one leg 32 thereof extending into the opening 25 in the pick-up head 11 and is clamped therein by the set screw 26. The tubular member 31 is hingedly fastened to the other leg 33 of this U-shaped member 30. In my preferred device this U-shaped member 30 is constructed from a material having springlike qualities. These springlike qualities will hold the stylus in the groove of the record while it is rotating regardless of the position in which the record is placed. Formerly, the weight of the pick-up head was required to hold the stylus in the record groove. In my device, the springlike qualities of this U-shaped member 30 make it possible to hold the stylus in the groove on the top side or the bottom side of the record when the record is playing in a horizontal position.

Figure 5:
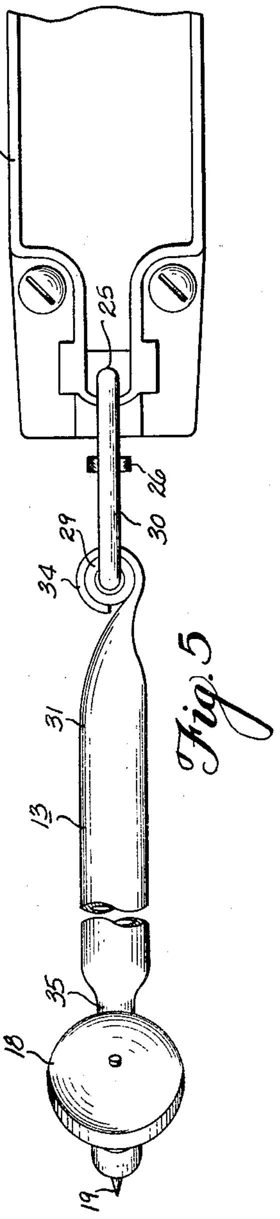
Figure 5 is a top view of Figure 4.

The arm member 31 is hingedly fastened to the leg 33 to permit it to partially rotate with respect to the record player and thus carry the stylus transversely of the record between the edge and the center thereof. In Figure 5, it is illustrated that the tubular member 31 is flattened on the end thereof which is fastened to the U-shaped member 30. This flattened end portion 34 forms an outside clamp and extends substantially about the leg 33 of the U-shaped member 30. I have inserted a rubber bushing 29 between the flattened end portion 34 and the leg 33. Although I have described this connection as having a rubber bushing 29, it is understood that other suitable material may be used therefor.

Figure 6:
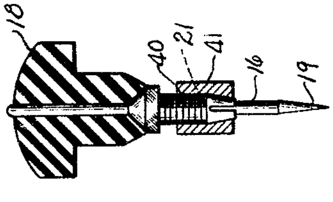
Figure 6 is a cross-sectional view taken along the lines 6—6 of Figure 4.

The stylus 16 and the vibration dampening mass 18 may be fastened by suitable means to the end 35 of the arm member 31. The end 35 is that end which will travel transversely over the record between the circumferential edge and the center. Although other suitable means may be used, my preferred method of fastening the stylus 16 and the vibration dampening mass 18 to the end 35 of the tubular arm member 31, is best illustrated in Figures 4 and 6 of my drawings. A chuck screw means 40 may be used to grip and hold the stylus. A chuck part 41, into which the chuck screw means 40 is turned to grip the stylus, may be fastened to the end 35 of the tubular arm member 31 by rivets 28 or other suitable means. The vibration dampening mass 18 may be fastened to the chuck screw means 40 and used as the handle therefor.

In my preferred mechanism the vibration dampening mass 18 is constructed from soft latex or live rubber. However, other suitable material having similar qualities may be used. By varying the weight and thus the inertia of this vibration dampening mass 18 the position of the imaginery pivot point 21 may be changed. To have my device work at its best, the vibration dampening mass 18 should have such weight and inertia that the imaginery pivot point 21 is aligned substantially on the longitudinal axis of the arm member 13.

Soft latex rubber has a low Q value and is a very good vibration dampening material. Other materials, which are not vibration dampening material, tend to establish in themselves a vibration and will vibrate at a resonating natural frequency of that material. Rubber, or other vibration dampening material, does not vibrate at a resonating natural frequency which would disturb the torsional vibration of the connecting arm 31.

Figure 7:
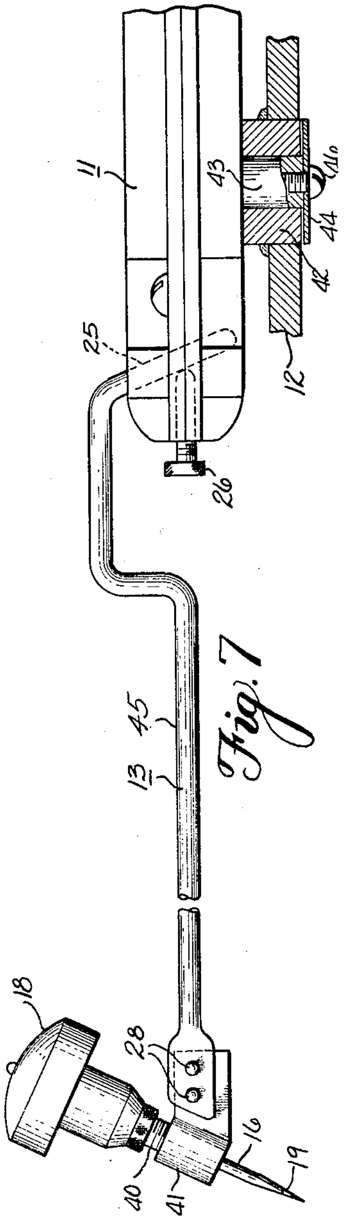
Figure 7 is a modification of my pick-up device.

In Figure 7, I illustrate a modification of my device, in that the pick-up head 11 may be partially rotated with respect to the record player 12 to permit the stylus to travel transversely across the record. In this modification, I have used a single wire 45 in place of the stylus support arm 13. A bearing sleeve 42 may be welded or otherwise fastened in the record support means 12. A rod 43, which is fastened to and carries the pick-up head 11 rotates in this bearing 42. Washer means 44 fastened by a screw 46 or by other suitable means to the rod 43 prevents the rod from disengaging itself with the bearing 42. It is to be understood, that other suitable means may be used to support the pick-up head 11 and at the same time permit it to partially rotate to permit the stylus 16 to travel transversely across the record 10. One advantage of my modification is that I can use a stylus support arm having a length substantially the same as that in the preferred embodiment for a record having a greater diameter than that used with my preferred stylus support arm. The operation of my modified device is otherwise very similar to that of my preferred device.

The operation of my device or mechanism for producing sound from the undulated grooves on the phonograph record as the record is rotated is substantially as follows: The stylus engages the undulated grooves on the record and is vibrated thereby. The vibration dampening mass has an inertia which substantially prevents it vibrating. The vibration dampening mass and the stylus cooperate to establish an imaginary pivot point about which torsional vibrations are produced when the stylus is vibrated. The stylus support arm 13, which engages and supports the vibration dampening mass and the stylus at the imaginary pivot point transmits the torsional vibration or movement produced by the cooperation of the stylus and the vibration dampening mass to the pick-up head. At the pick-up head these torsional movements are transformed into electrical variations.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A device for producing sound from the undulated grooves on a phonograph record as the record is rotated, said device comprising, a stylus for engaging the undulated grooves on the record, a vibration damping mass having chuck means for holding said stylus, said stylus and said vibration damping mass cooperating to produce substantially only torsional movement when said stylus is vibrated by said undulated grooves on said record, a pick-up head responsive to said torsional movements for producing electrical variations, movement transmitting means for transmitting said torsional movements produced by said stylus and said mass to said pick-up head, said movement transmitting means having a first arm supported by said pick-up head and a second arm for supporting said mass, said movement transmitting means having hinge means interconnecting said first and said second arm, said stylus upon traversing said rotating record moving said second arm with respect to said first arm about said hinge means.

2. A phonograph record pick up comprising, a transducer for utilizing torsional vibrations along an axis thereof, a torsional vibration transmitting arm having a first and a second arm portion, said first arm portion being fastened to said transducer, said second arm portion having a first end fastened to the first arm portion, said second arm portion being substantially straight and extending along the axis of said transducer, a second end on said second arm portion, a stylus held by said second end of said second arm portion and extending transversely thereof to engage a phonograph record, and a vibration damping mass axially mounted on said stylus and extending transverse of said second arm portion on the opposite side thereof from said stylus and producing in combination with said stylus a center of oscillation thereof substantially on the axis of said second arm portion.

3. A phonograph record pick up comprising, a transducer for utilizing torsional vibrations along an axis thereof, a torsional vibration transmitting arm having a first and a second arm portion, said first arm portion being substantially U-shaped with one leg thereof firmly fastened to said transducer, said first arm portion having sufficient elasticity to provide a spring action tending to retain its original shape, said second arm portion having a first end fastened to the other leg of said U-shaped first arm portion, said second arm portion being substantially straight and extending along the axis of said transducer, a second end on said second arm portion, a stylus held by said second end of said second arm portion and extending transversely thereof to engage a phonograph record under the urging of said spring action of said first arm portion, and a vibration damping mass axially mounted on said stylus and extending transverse of said second arm portion on the opposite side thereof from said stylus and producing in combination with said stylus a center of oscillation thereof substantially on the axis of said second arm portion.

4. A phonograph record pick up comprising, an electromechanical translating device for producing electrical variations in accordance with mechanical torsional vibrations along an axis thereof, a torsional vibration transmitting arm having a first and a second arm portion, said first arm portion being substantially U-shaped with one leg thereof firmly fastened to said electromechanical translating device, said first arm portion having sufficient elasticity to provide a spring action tending to retain its original shape, said second arm portion having a first end fastened to the other leg of said U-shaped first arm portion, said second arm portion being substantially straight and extending along the axis of said electromechanical translating device, a second end on said second arm portion, a stylus in firm metallic contact with said second end of said second arm portion and extending transversely thereof to engage a phonograph record under the urging of said spring action of said first arm portion, and a vibration damping mass of soft rubber axially mounted on said stylus and extending transverse of said second arm portion on the opposite side thereof from said stylus.

STANLEY A. HALL.

REFERENCES CITED

The following references are of record in the file of this patent:

UNITED STATES PATENTS

| Number | Name | Date |
|---|---|---|
| 1,149,514 | Hiles | Aug. 10, 1915 |
| 1,156,931 | Repp | Oct. 19, 1915 |
| 1,172,717 | Laurencich | Feb. 22, 1916 |
| 1,760,647 | Hopkins | May 27, 1930 |
| 1,776,045 | Rogers | Sept. 16, 1930 |
| 1,844,623 | Yeider | Feb. 9, 1932 |
| 1,996,104 | Forte | Apr. 2, 1935 |
| 2,092,884 | Kendall | Sept. 14, 1937 |
| 2,363,497 | Begun | Nov. 28, 1944 |
| 2,381,861 | Bauer | Aug. 14, 1945 |
| 2,451,221 | Hutter | Oct. 12, 1948 |
| 2,465,288 | Sinnett | Mar. 22, 1949 |
| 2,479,894 | Andrews | Aug. 23, 1949 |